US012698583B2

(12) United States Patent
Kang et al.

(10) Patent No.: US 12,698,583 B2
(45) Date of Patent: Aug. 4, 2026

(54) DRUM WASHING MACHINE

(71) Applicant: LG Electronics Inc., Seoul (KR)

(72) Inventors: Joohang Kang, Seoul (KR);
Youngchan Ahn, Seoul (KR); Junggu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 18/242,883

(22) Filed: Sep. 6, 2023

(65) Prior Publication Data

US 2024/0133107 A1 Apr. 25, 2024
US 2024/0229328 A9 Jul. 11, 2024

(30) Foreign Application Priority Data

Oct. 21, 2022 (KR) .......................... 10-2022-0136435

(51) Int. Cl.
*D06F 37/30* (2020.01)
*D06F 37/26* (2006.01)
*D06F 37/36* (2006.01)
*D06F 37/40* (2006.01)
(Continued)

(52) U.S. Cl.
CPC .......... *D06F 37/304* (2013.01); *D06F 37/262* (2013.01); *D06F 37/36* (2013.01); *D06F 37/40* (2013.01); *F16H 3/44* (2013.01); *F16H 2003/442* (2013.01); *F16H 2057/085* (2013.01)

(58) Field of Classification Search
CPC ...... D06F 37/304; D06F 37/262; D06F 37/36; D06F 37/40; F16H 3/44; F16H 2003/442; F16H 2057/085
See application file for complete search history.

(56) References Cited

U.S. PATENT DOCUMENTS

| | | | | |
|---|---|---|---|---|
| 2,975,528 A | * | 3/1961 | Shewmon | ............... D06F 58/08 |
| | | | | 310/67 R |
| 6,626,014 B2 | * | 9/2003 | Heyder | ................. D06F 37/304 |
| | | | | 34/601 |
| 2004/0139768 A1 | | 7/2004 | Kim et al. | |

(Continued)

FOREIGN PATENT DOCUMENTS

| | | |
|---|---|---|
| KR | 10-2005-0081917 A | 8/2005 |
| KR | 10-1885203 B1 | 8/2018 |

(Continued)

OTHER PUBLICATIONS

Notice of Allowance in Korean Appln. No. 10-2022-0136435, mailed on May 27, 2025, 4 pages (with English translation).

(Continued)

*Primary Examiner* — Joseph L. Perrin
(74) *Attorney, Agent, or Firm* — Fish & Richardson P.C.

(57) ABSTRACT

A drum washing machine includes an inner tub and a drive system coupled to the inner tub. The drive system includes a housing, a motor disposed on one side of the housing, a rotor shaft coupled to the motor and bearing-coupled to the housing, an output shaft bearing-coupled to the housing, and wherein at least part of the output shaft is disposed in the rotor shaft, a planetary gear set that a part of the planetary gear set is spline-coupled to the rotor shaft, and other part of the planetary gear set is spline-coupled to the output shaft, and an actuator moving the planetary gear set in a horizontal direction, wherein the housing is integrally formed with the inner tub.

20 Claims, 14 Drawing Sheets

(51) Int. Cl.
*F16H 3/44*          (2006.01)
*F16H 57/08*          (2006.01)

(56)          References Cited

U.S. PATENT DOCUMENTS

| | | | | |
|---|---|---|---|---|
| 2011/0197637 A1 * | 8/2011 | Jun | D06F 37/04 | |
| | | | 68/140 | |
| 2012/0222455 A1 * | 9/2012 | Hasan-Reisoglu | D06F 37/225 | |
| | | | 68/142 | |
| 2017/0247828 A1 * | 8/2017 | Tsuji | D06F 37/065 | |
| 2017/0284007 A1 * | 10/2017 | Hirota | D06F 23/02 | |
| 2018/0347096 A1 * | 12/2018 | Yoneda | D06F 23/06 | |
| 2018/0347097 A1 * | 12/2018 | Yoneda | D06F 34/08 | |
| 2018/0371670 A1 * | 12/2018 | Tanikoshi | D06F 37/304 | |
| 2019/0257020 A1 * | 8/2019 | Ikeda | D06F 23/02 | |
| 2019/0390391 A1 | 12/2019 | Jang et al. | | |
| 2020/0232143 A1 * | 7/2020 | Sonoda | D06F 33/00 | |
| 2020/0362499 A1 * | 11/2020 | Nam | D06F 37/206 | |
| 2021/0025099 A1 * | 1/2021 | Lin | D06F 37/30 | |
| 2021/0025100 A1 * | 1/2021 | Lin | F16H 3/44 | |

FOREIGN PATENT DOCUMENTS

| | | |
|---|---|---|
| KR | 10-1920812 | 11/2018 |
| KR | 10-2019-0101847 | 9/2019 |
| KR | 10-2020-0089604 | 7/2020 |

OTHER PUBLICATIONS

Office Action in Korean Appln. No. 10-2022-0136435, mailed on Nov. 13, 2024, 13 pages (with English translation).
Extended European Search Report in European Appln. No. 23186063. 6, mailed on Mar. 11, 2024, 8 pages.

* cited by examiner

100

DRUM WASHING MACHINE

CROSS-REFERENCE TO RELATED APPLICATION

This application claims priority to and the benefit of Korean Patent Application No. 10-2022-0136435, filed in the Korean Intellectual Property Office, on Oct. 21, 2022, the entire contents of which are incorporated herein by reference.

BACKGROUND OF THE INVENTION

Field of the Invention

The present disclosure relates to a drum washing machine, more specifically, to a drum washing machine having a planetary gear clutch that operates mechanically.

Description of the Related Art

The washing machine is driven in two main operating modes (washing mode and spin-drying mode) with different operating conditions.

Therefore, in order to satisfy both of the above two main operating modes, the washing machine is provided with a planetary gear set and a clutch, and operates an output shaft at low speed and high torque with a gear ratio of n:1 (washing mode), or operates the output shaft at high speed and low torque with a gear ratio of 1:1 (spin-drying mode).

Here, the output shaft refers to a shaft coupled to a drum to rotate the drum. The drum may be referred to as the "inner tub."

That is, in a normal washing machine, after the washing mode or the rinsing mode is ended, the motor is temporarily stopped, and a draining operation is performed. And, after the draining operation ends, a spin-drying initial mode starts.

However, since high torque is required to initially start wet laundry in the spin-drying initial mode, the output shaft must be operated at low speed and high torque.

In addition, in order to start the spin-drying mode after the spin-drying initial mode is completed, the output shaft must be operated at high speed and low torque.

Therefore, the drive system of the washing machine includes parts for shifting a rotational force of the rotor shaft transmitted to the output shaft between the spin-drying initial mode and the spin-drying mode, for example, a planetary gear set and a clutch.

As an example of a related art related to the present disclosure, Korean Patent Publication No. KR10-2020-0089604 (hereinafter referred to as "Related Art 1") discloses a structure for changing a gear ratio by installing a planetary gear set including carriers, sun gears, multiple satellite gears, internal gears, etc. in a rotor case and changing the position of the internal gear by a solenoid clutch.

That is, in the case of Related Art 1, the washing machine is operated at low speed and high torque by allowing the internal gear to be supported by the stator through the slider of the solenoid clutch in the spin-drying initial mode, and by allowing rotations of the rotor shaft and the sun gear to be transmitted to the output shaft through the planetary gear set.

In addition, the washing machine is operated at high speed and low torque by allowing the internal gear to be supported on the rotor shaft through the slider of the solenoid clutch in the spin-drying mode, and by allowing rotations of the rotor shaft and the sun gear to be transmitted to the output shaft without going through the planetary gear set.

However, according to the drive system disclosed in Related Art 1, since a larger coil is required to obtain sufficient electromagnetic force to move the solenoid clutch, there is a problem in that the weight and volume of the solenoid clutch increases.

In addition, since the solenoid clutch is positioned behind the rotor and the stator, it is disadvantageous to secure the volume of the washing machine, and in order to apply power to the solenoid clutch, a separate circuit must be configured and wired between the rotor and the stator, so that there are problems such as difficult wiring work.

As another example of a related art related to present disclosure, Korean Patent Registration Publication No. KR10-1920812 (hereinafter referred to as "Related Art 2") discloses a structure for changing a gear ratio while moving the position of a deceleration coupling unit including the planetary gear set forward and backward using a lever.

That is, in the case of Related Art 2, in the spin-drying initial mode, the deceleration coupling unit is moved forward according to the operation of the lever of the lever unit, and accordingly, teeth formed on the coupling cap of the deceleration coupling unit are engaged with teeth formed on the drum, so that the washing machine is operated at low speed and high torque.

In the spin-drying mode, the deceleration coupling unit is moved backward according to the operation of the lever of the lever unit, and accordingly, teeth formed on the coupling housing of the deceleration coupling unit are engaged with teeth formed on the rotor housing, so that the washing machine is operated at high speed and low torque.

However, according to the driving system disclosed in Related Art 2, since the pinion gear provided in the carrier of the deceleration coupling unit must move in the axial direction with respect to the sun gear, only the spur gear, not helical gears, can be used as the pinion gear and the sun gear, and there is a problem in that noise is generated due to this.

In addition, since the forward and backward movement of the deceleration coupling unit is possible only while the motor is stopped, there is a problem in that the motor must be stopped for mode conversion.

In addition, the sun gear provided in the planetary gear set is mounted on a bearing on the output shaft, and the output shaft is supported by only one bearing.

Therefore, in the spin-drying initial mode, the planetary gear set serves as a support point, so that the output shaft is supported by the planetary gear set and the bearing, but in the spin-drying mode, since the rotor, the planetary gear set, and the output shaft operate as one, and the output shaft is supported by only one bearing, there is a problem of low durability in the spin-drying mode operating at high speed and low torque.

PRIOR TECHNICAL LITERATURE

Patent Document

Related Art 1: Korean Patent Publication No. KR10-2020-0089604
Related Art 2: Korean Patent Registration Publication No. KR10-1920812

SUMMARY OF THE INVENTION

A problem to be solved by the present disclosure is to provide a drum washing machine capable of reducing the tolerance between parts and reducing the cost of the product.

In addition, it is to provide a drum washing machine capable of implementing a washing mode and a spin-drying mode by moving the entire planetary gear set without a stop operation between ending washing and starting spin-drying.

In addition, it is to provide a drum washing machine capable of improving space efficiency by reducing a length of the drum washing machine in a horizontal direction.

In addition, a problem to be solved by the present disclosure is to provide a drum washing machine capable of increasing the safety factor of the gears provided in the planetary gear set, and reducing the noise generated during gear rotation.

In addition, a problem to be solved by the present disclosure is to provide a drum washing machine capable of improving rotational stability of the output shaft since two bearings support the output shaft.

A drum washing machine according to one aspect of the present disclosure for achieving the above object includes an inner tub and a drive system of a washing machine coupled to the inner tub.

The drive system of the washing machine may include a housing, a motor disposed on one side of the housing, a rotor shaft coupled to the motor and bearing-coupled to the housing, an output shaft bearing-coupled to the housing, and wherein at least part of the output shaft is disposed in the rotor shaft, a planetary gear set that a part of the planetary gear set is spline-coupled to the rotor shaft, and other part of the planetary gear set is spline-coupled to the output shaft, and an actuator moving the planetary gear set in a horizontal direction, wherein, the housing may be integrally formed with the inner tub.

In this case, the inner tub may be formed of a plastic material, the housing may be formed of a metal material, and the housing may be double-injected with the inner tub.

Specifically, the inner tub may include a protruding area protruding from a central area of one surface of the inner tub to other side, and the housing may be double-injected into the protruding area.

Through this, it is possible to reduce tolerance and reduce product cost compared to forming the housing and the inner tub separately and combining the housing and the inner tub.

In addition, the drive system of the washing machine may include a first bearing disposed between the output shaft and the housing, and a second bearing disposed between the rotor shaft and the housing, and wherein the planetary gear set may be disposed between the first bearing and the second bearing.

In this case, the inner tub may include a protruding area protruding from a central area of one surface of the inner tub to other side, the first bearing may overlap with the protruding area in a vertical direction, and the second bearing may not overlap with the inner tub in the vertical direction.

In addition, the planetary gear set may be disposed on one side of the inner tub, and the planetary gear set may overlap with the inner tub in a vertical direction as a whole.

Through this, it is possible to improve space efficiency by reducing the length of the drum washing machine in horizontal direction.

In addition, the motor may not overlap with the inner tub in a vertical direction.

Through this, heat generated from the motor can be easily dissipated to the outside.

In addition, the planetary gear set may include a sun gear spline-coupled to the rotor shaft, a plurality of pinion gears coupled to an outer circumferential surface of the sun gear and spaced apart in a circumferential direction, a ring gear that an inner circumferential surface of the ring gear is coupled to the plurality of pinion gears, and a carrier coupled to the plurality of pinion gears and spline-coupled to the output shaft.

In this case, when the planetary gear set is moved to one side, a part of the planetary gear set may be coupled to the rotor shaft to transmit a rotational force of the rotor shaft to the output shaft at a ratio of 1:1, and when the planetary gear set is moved to other side, another part of the planetary gear set may be coupled to the housing to reduce and transmit the rotational force of the rotor shaft to the output shaft at a gear ratio of n:1.

Through this, it is possible to implement a washing mode and a spin-drying mode by moving the entire planetary gear set without a stop operation between ending washing and starting spin-drying.

In addition, the sun gear, the plurality of pinion gears, and the ring gear may include helical gears.

Through this, it is possible to increase the safety factor of the gears provided in the planetary gear set, and reduce the noise generated during gear rotation.

A drum washing machine according to one aspect of the present disclosure for achieving the above object includes an inner tub and a drive system of a washing machine coupled to the inner tub.

The drive system of a washing machine may include a housing, a motor disposed on one side of the housing, a rotor shaft coupled to the motor and bearing-coupled to the housing, an output shaft bearing-coupled to the housing, and wherein at least part of the output shaft is disposed in the rotor shaft, a planetary gear set that a part of the planetary gear set is spline-coupled to the rotor shaft, and other part of the planetary gear set is spline-coupled to the output shaft, and an actuator moving the planetary gear set in a horizontal direction, wherein, the planetary gear set may be disposed on one side of the inner tub and may overlap with the inner tub in a vertical direction as a whole.

Through this, it is possible to improve space efficiency since the length of the drum washing machine in the horizontal direction can be reduced.

In addition, the inner tub may include a protruding area protruding from a central area of one surface of the inner tub to other side, and the housing may be double-injected into the protruding area.

Through this, it is possible to reduce tolerance and reduce product cost compared to forming the housing and the inner tub separately and combining the housing and the inner tub.

In addition, the drive system of the washing machine may include a first bearing disposed between the output shaft and the housing, and a second bearing disposed between the rotor shaft and the housing, and wherein the planetary gear set may be disposed between the first bearing and the second bearing.

In addition, the inner tub may include a protruding area protruding from a central area of one surface of the inner tub to other side, the first bearing may overlap with the protruding area in the vertical direction, and the second bearing may not overlap with the inner tub in the vertical direction.

In addition, the motor may not overlap with the inner tub in the vertical direction.

Through this, heat generated from the motor can be easily dissipated to the outside.

Through the present disclosure, it is possible to provide a drum washing machine capable of reducing the tolerance between parts and reducing the cost of the product.

In addition, through the present disclosure, it is possible to provide the drum washing machine capable of implementing a washing mode and a spin-drying mode by moving the entire planetary gear set without a stop operation between ending washing and starting spin-drying.

In addition, through the present disclosure, it is possible to provide the drum washing machine capable of improving space efficiency by reducing the length of the drum washing machine in the horizontal direction.

In addition, through the present disclosure, it is possible to provide the a drum washing machine capable of increasing the safety factor of the gears provided in the planetary gear set, and reducing the noise generated during gear rotation.

In addition, through the present disclosure, it is possible to provide the a drum washing machine capable of improving rotational stability of the output shaft since two bearings support the output shaft.

DETAILED DESCRIPTION OF THE EMBODIMENTS

Figure 1:
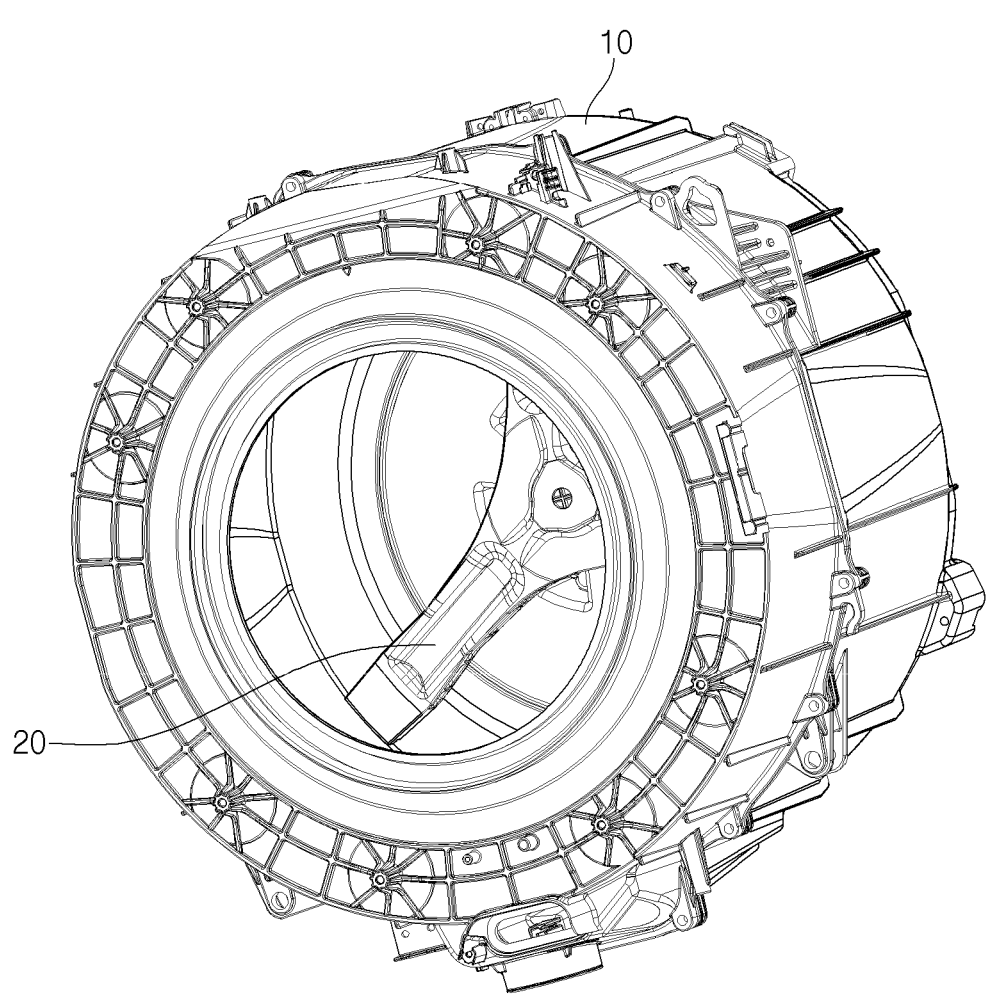
FIGS. 1 and 2 are perspective views of a tub of a washing machine and a drive system of a washing machine according to an embodiment of the present disclosure.

Hereinafter, embodiments disclosed in the present disclosure will be described in detail with reference to the accompanying drawings, however, regardless of the reference numerals, the same or similar components will be given the same reference numerals and redundant description thereof will be omitted.

In describing the embodiments disclosed in the present disclosure, when a component is referred to as being "connected" or "accessed" to other component, it may be directly connected or accessed to the other component, however, it may be understood that other components may be present in the middle.

In addition, in describing the embodiments disclosed in the present disclosure, when it is determined that the detailed description of the related known technology may obscure the subject matter of the embodiments disclosed in the present disclosure, the detailed description thereof will be omitted. In addition, the accompanying drawings are only for easily understanding the embodiments disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

On the other hand, terms of disclosure may be replaced with terms such as document, specification, description.

Figure 2:
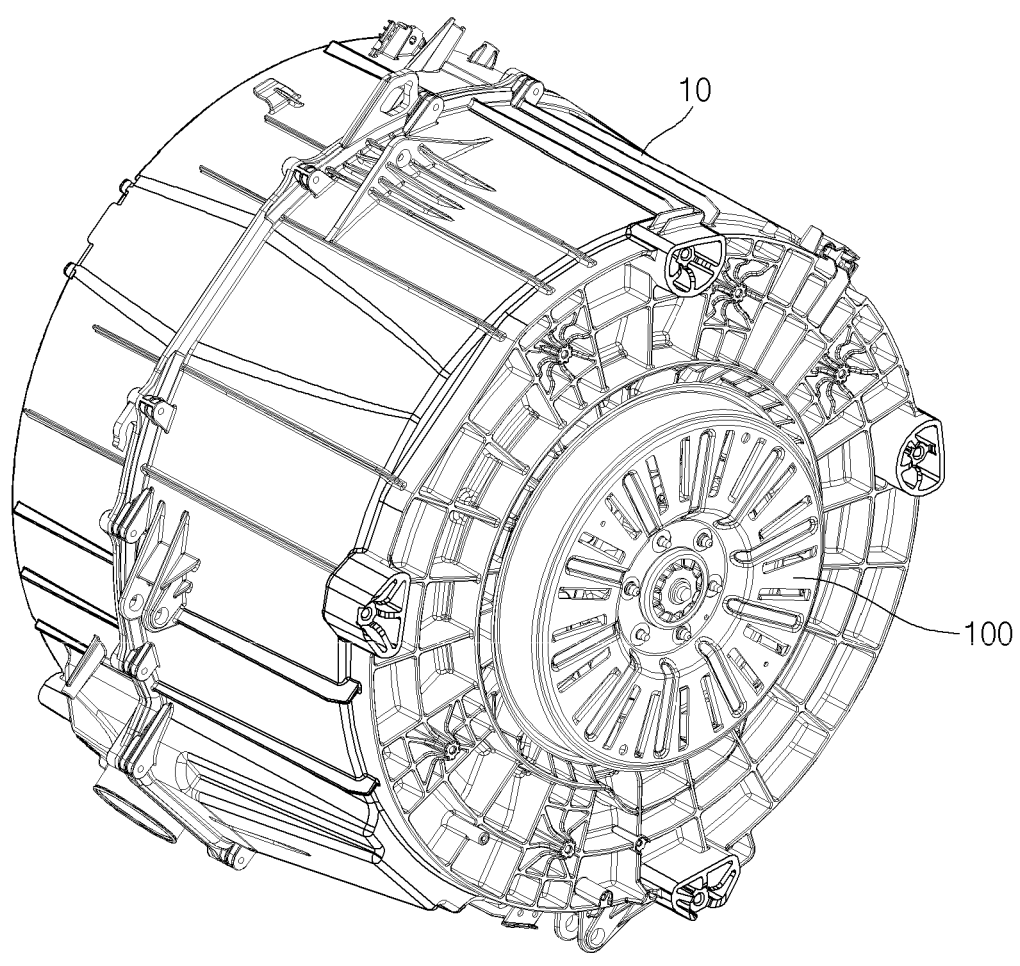
Figure 3:
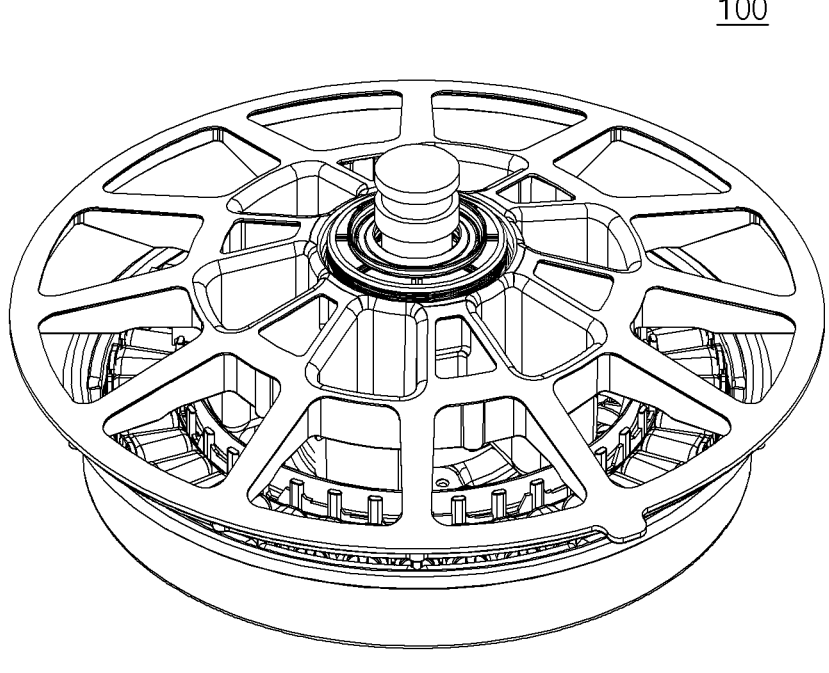
FIG. 3 is a perspective view of a drive system of a washing machine according to an embodiment of the present disclosure.
Figure 4:
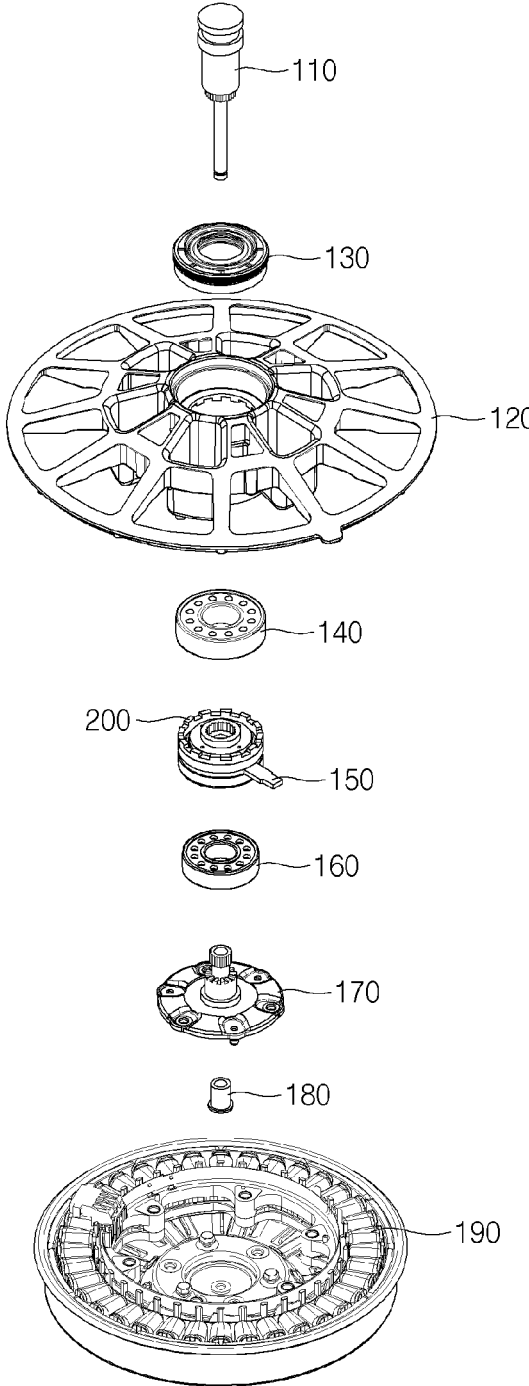
FIG. 4 is an exploded perspective view of a drive system of a washing machine according to an embodiment of the present disclosure.
Figure 5:
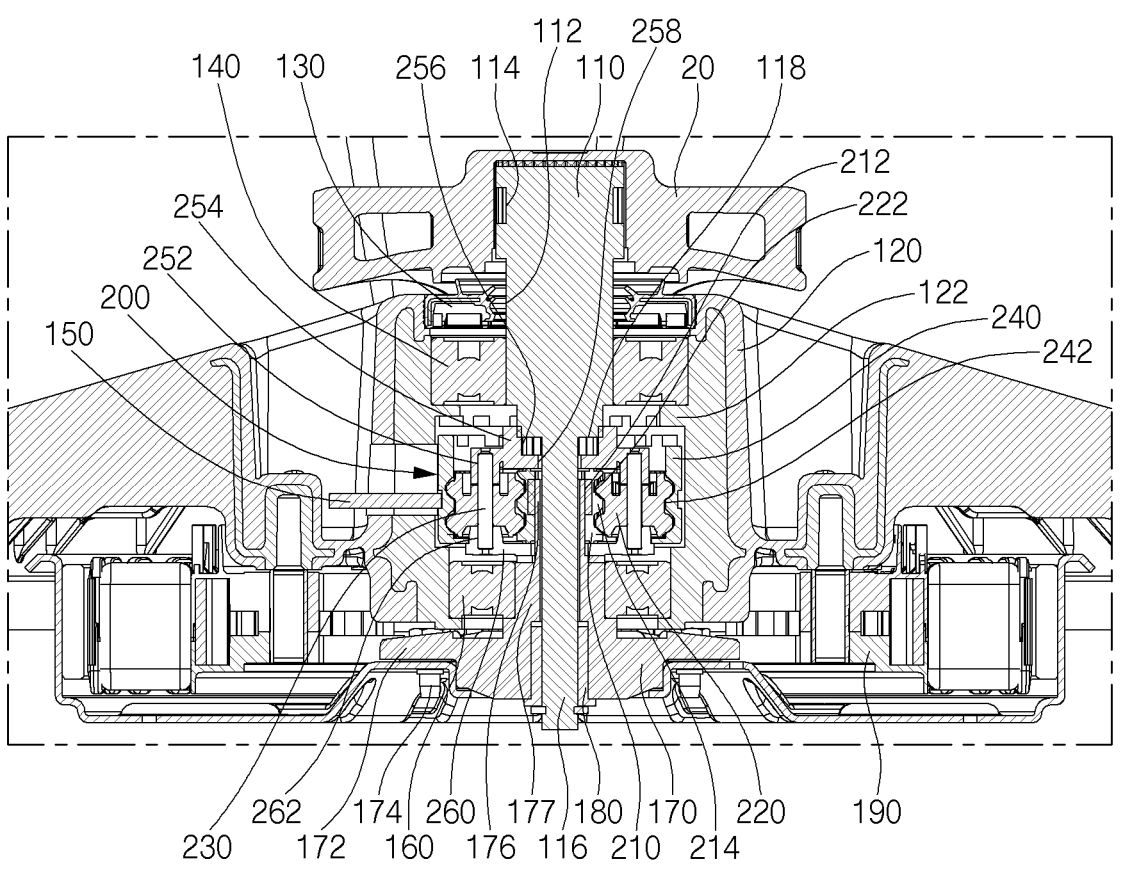
FIG. 5 is a cross-sectional view of a drive system of a washing machine according to an embodiment of the present disclosure.
Figure 6:
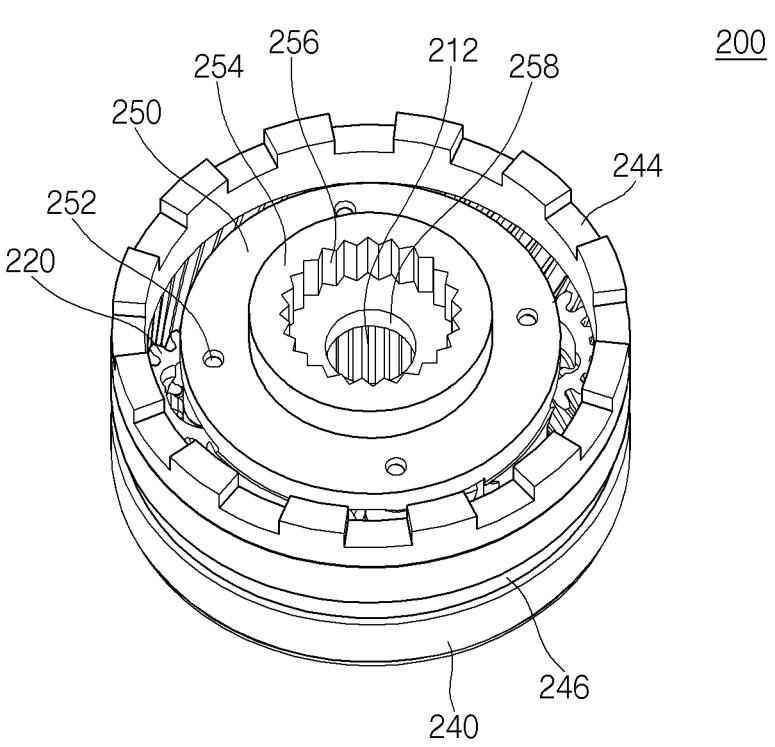
FIG. 6 is a perspective view of a planetary gear set of a drive system of a washing machine according to an embodiment of the present disclosure.
Figure 7:
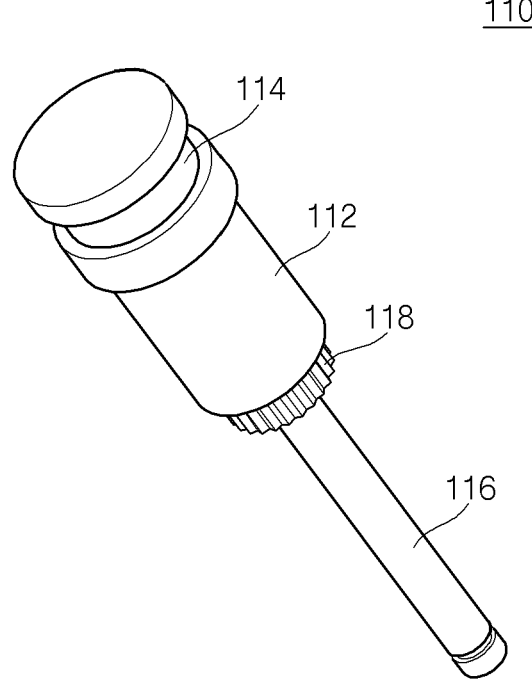
FIG. 7 is a perspective view of an output shaft of a drive system of a washing machine according to an embodiment of the present disclosure.
Figure 8:
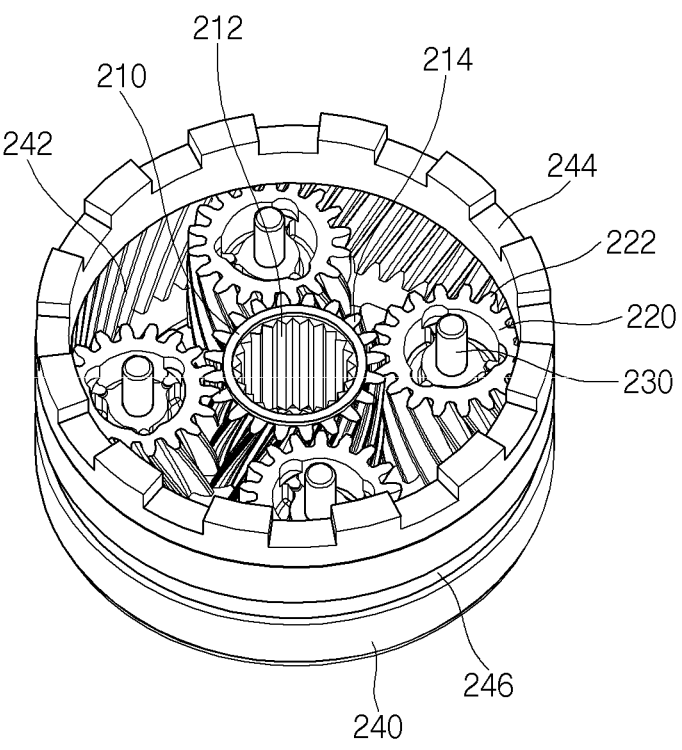
FIG. 8 is a view in which the first carrier is removed from FIG. 6.
Figure 9:
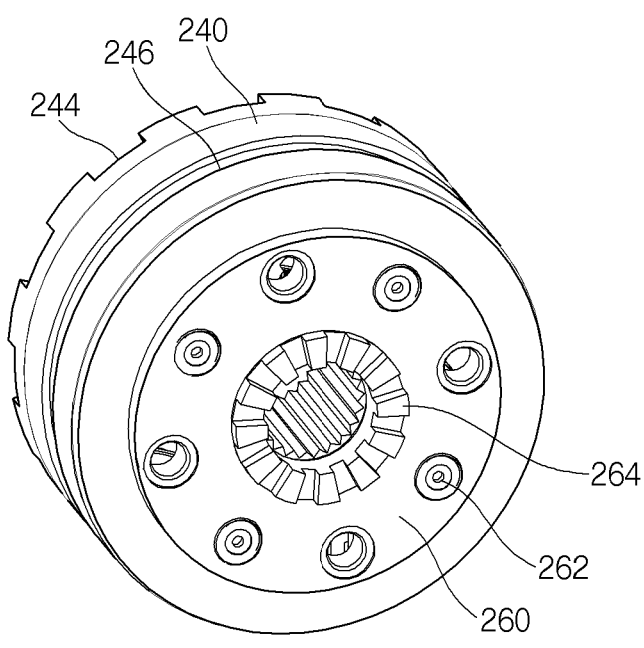
FIG. 9 is a perspective view of a planetary gear set of a drive system of a washing machine according to an embodiment of the present disclosure.
Figure 10:
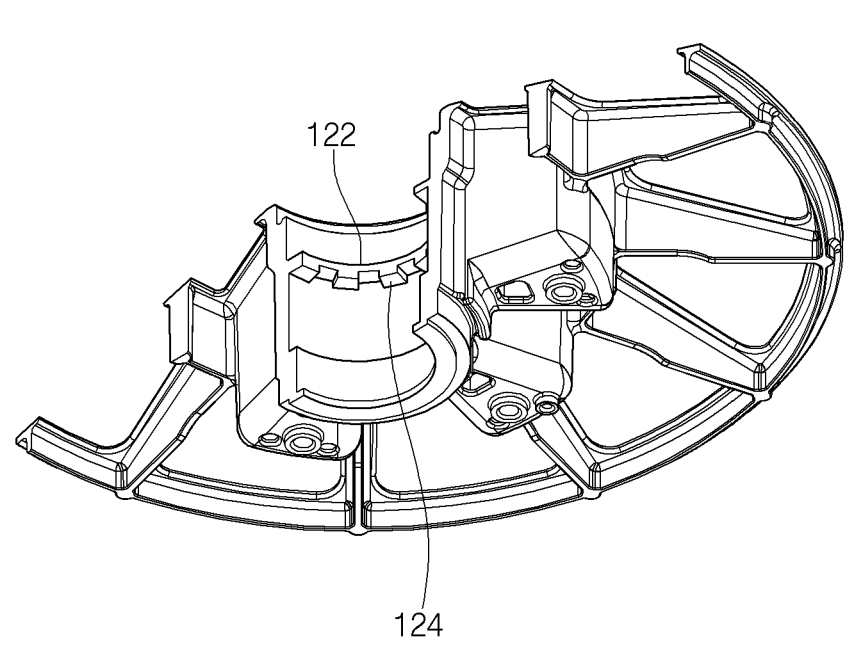
FIG. 10 is a cross-sectional perspective view of a housing of a drive system of a washing machine according to an embodiment of the present disclosure.
Figure 11:
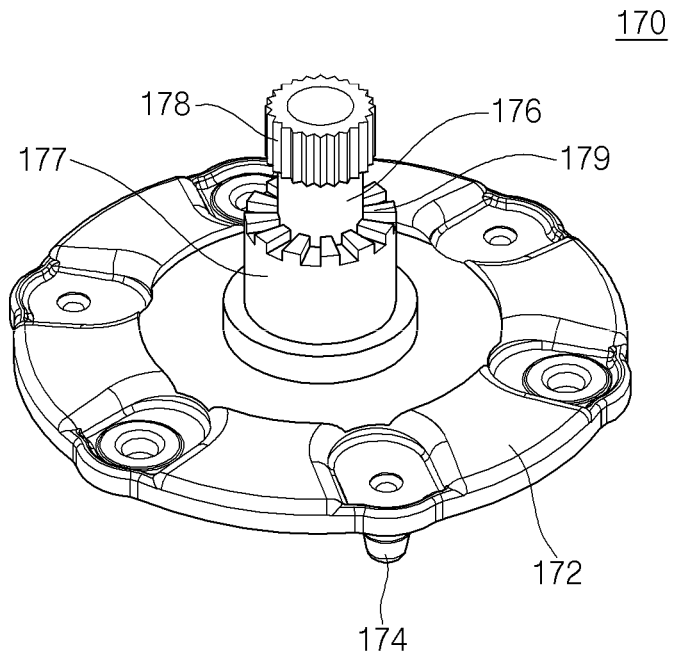
FIG. 11 is a perspective view of a rotor shaft of a drive system of a washing machine according to an embodiment of the present disclosure.

FIGS. 1 and 2 are perspective views of a tub of a washing machine and a drive system of a washing machine according to an embodiment of the present disclosure. FIG. 3 is a perspective view of a drive system of a washing machine according to an embodiment of the present disclosure. FIG. 4 is an exploded perspective view of a drive system of a washing machine according to an embodiment of the present disclosure. FIG. 5 is a cross-sectional view of a drive system of a washing machine according to an embodiment of the present disclosure. FIG. 6 is a perspective view of a planetary gear set of a drive system of a washing machine according to an embodiment of the present disclosure. FIG. 7 is a perspective view of an output shaft of a drive system of a washing machine according to an embodiment of the present disclosure. FIG. 8 is a view in which the first carrier is removed from FIG. 6. FIG. 9 is a perspective view of a planetary gear set of a drive system of a washing machine according to an embodiment of the present disclosure. FIG. 10 is a cross-sectional perspective view of a housing of a drive system of a washing machine according to an embodiment of the present disclosure. FIG. 11 is a perspective view of a rotor shaft of a drive system of a washing machine according to an embodiment of the present disclosure.

Referring to FIGS. 1 to 11, a washing machine according to an embodiment of the present disclosure may include an inner tub 10, a pulsator 20, and a drive system 100 of a washing machine, but it may be implemented except for some of these configurations, and does not exclude other additional configurations.

The washing machine according to an embodiment of the present disclosure may be a top loading type in which the center of rotation of the inner tub is formed in a direction perpendicular to the floor and it is designed for the laundry to be loaded from the top and a front loading type in which the center of rotation of the inner tub is formed in a direction horizontal to the floor or it is inclined in a downward direction toward the rear end, and it is designed for the laundry to be loaded from the front.

The inner tub 10 may have a cylindrical shape open to the top or front. The pulsator 20 may be disposed on the bottom surface of the inner tub 10. The pulsator 20 may be connected to an output shaft 110 of the drive system 100 of the washing machine. The drive system 100 of the washing machine may be coupled to the inner tub 10 to rotate the pulsator 20.

The drive system 100 of the washing machine according to an embodiment of the present disclosure may include a housing 120, an output shaft 110, a first bearing 140, a second bearing 160, and a planetary gear set 200, an actuator 150, a rotor shaft 170, a motor 190, and a bushing 180, but it may be implemented except for some of these configurations, and does not exclude other additional configurations.

The output shaft 110 may be rotatably disposed in the housing 120. The pulsator 20 may be disposed above the housing 120. The housing 120 may be coupled to the inner tub 10. The motor 190 may be disposed below the housing 120. The housing 120 may be coupled to the planetary gear set 200.

The housing 120 may include a second clutch portion 124. The second clutch portion 124 may protrude inward from an inner circumferential surface of the housing 120 and protrude downward from a circumferential portion 122 extending in a circumferential direction. The second clutch portion 124 may engage with a first clutch portion 244 of a ring gear 240 of the planetary gear set 200 when the planetary gear set 200 is moved to the top or the other side. The second clutch portion 124 may be formed in a shape complementary to that of the first clutch portion 244.

The output shaft 110 may extend in the axial direction. The output shaft 110 may be coupled to the pulsator 20. The output shaft 110 may be rotatably coupled to the housing 120. The output shaft 110 may be bearing-coupled to the housing 120. The output shaft 110 may be rotatably coupled to the rotor shaft 170 at the same speed or at different speeds. The output shaft 110 may be bushing-coupled to the rotor shaft 170.

The pulsator 20 may be coupled to an upper region 114 of the output shaft 110.

A central region 112 of the output shaft 110 may be bearing-coupled to the housing 120. The first bearing 140 may be disposed between the central region 112 of the output shaft 110 and the housing 120.

A lower region 116 of the output shaft 110 may be disposed within the rotor shaft 170. The lower region 116 of the output shaft 110 may be coupled to the rotor shaft 170. The bushing 180 may be disposed between the lower region 116 of the output shaft 110 and the rotor shaft 170. A diameter of the lower region 116 of the output shaft 110 may be smaller than a diameter of the central region 112. An axial length of the lower region 116 of the output shaft 110 may be longer than an axial length of the central region 112 of the output shaft 110. In one embodiment of the present disclosure, the axial direction may be interpreted as meaning a vertical direction based on FIGS. 3 to 5.

The output shaft 110 may include a second spline portion 118 formed on an outer circumferential surface. The second spline portion 118 may protrude outward from the outer circumferential surface of the output shaft 110. The second spline portion 118 may be disposed between the central region 112 and the lower region 116 of the output shaft 110. The second spline portion 118 may be spline-coupled to a first spline portion 256 of a first carrier 250 of the planetary gear set 200. Here, a spline may mean a cut groove or a groove on a shaft or a bore, and a spline coupling may mean a coupling so that perturbation in the axial direction is possible and rotation together is possible The first bearing 140 may be disposed between the housing 120 and the output shaft 110. The first bearing 140 may bearing-couple the output shaft 110 to the housing 120. The first bearing 140 may rotatably couple the output shaft 110 to the housing 120. The first bearing 140 may extend in the circumferential direction. The first bearing 140 may be disposed below a fifth bearing 130. The first bearing 140 may be disposed above the planetary gear set 200.

The second bearing 160 may be disposed between the rotor shaft 170 and the housing 120. The second bearing 160 may be disposed below the planetary gear set 200. The second bearing 160 may bearing-couple the rotor shaft 170 to the housing 120. The second bearing 160 may rotatably couple the rotor shaft 170 to the housing 120. The second bearing 160 may extend in the circumferential direction.

A part of the planetary gear set 200 may be spline-coupled to the rotor shaft 170, and another part may be spline-coupled to the output shaft 110. The planetary gear set 200 may be vertically moved by a first actuator 150.

When the planetary gear set 200 is moved to one side or lower part, a part of the planetary gear set 200 may be coupled to the rotor shaft 170. In this case, the rotational force of the rotor shaft 170 may be transmitted to the output shaft 110 at a 1:1 ratio.

When the planetary gear set 200 is moved to the other side or upper part, another part of the planetary gear set 200 may be coupled to the housing 120. In this case, the rotational force of the rotor shaft 170 may be reduced at a gear ratio of n:1 and transmitted to the output shaft 110.

Through this, it is possible to implement a washing mode and a spin-drying mode by moving the entire planetary gear set 200 without a stop operation between ending washing and starting spin-drying.

The planetary gear set 200 may include a sun gear 210, a plurality of pinion gears 220, a ring gear 240, a connection portion 230, and carriers 250 and 260.

The sun gear 210 may be spline-coupled to the rotor shaft 170. Specifically, a third spline portion 212 formed on an inner circumferential surface of the sun gear 210 may be spline-coupled to a fourth spline portion 178 formed on an outer circumferential surface of the rotor shaft 170. A first helical gear 214 may be formed on an outer circumferential surface of the sun gear 210.

The plurality of pinion gears 220 may be spaced apart from each other in the circumferential direction. Outer circumferential surfaces of the plurality of pinion gears 220 may be coupled to the outer circumferential surfaces of the sun gear 210, respectively. A second helical gear 222 may be formed on the outer circumferential surfaces of the plurality of pinion gears 220.

In one embodiment of the present disclosure, the number of the plurality of pinion gears 220 is four as an example, but the number of the plurality of pinion gears 220 may be variously changed without being limited thereto.

A plurality of connection portions 230 may be formed inside each of the plurality of pinion gears 220. The plurality of pinion gears 220 may be connected to the carriers 250 and 260 through the connection portion 230.

An inner circumferential surface of the ring gear 240 may be coupled to the plurality of pinion gears 220. A third helical gear 242 may be formed on the inner circumferential surface of the ring gear 240.

The ring gear 240 may include the first clutch portion 244 formed on an upper surface. The first clutch portion 244 may be coupled to the second clutch portion 124 of the housing 120. Specifically, when the planetary gear set 200 moves upward, the first clutch portion 244 may be coupled to the second clutch portion 124. In this case, rotation of the ring gear 240 may be stopped, and low-speed and high-torque washing mode of n:1 may be implemented according to a gear ratio between the sun gear 210 and the plurality of pinion gears 220.

The carriers 250 and 260 may be coupled to the plurality of pinion gears 220. The carriers 250 and 260 may be coupled to the plurality of pinion gears 220 through the connection portion 230.

The carriers 250 and 260 may include a first carrier 250 disposed above the plurality of pinion gears 220 and a second carrier 260 disposed below the plurality of pinion gears 220. The first carrier 250 and the second carrier 260 may be connected to the plurality of pinion gears 220 through the connection portion 230.

The first carrier 250 may include a first coupling hole 252 to which the plurality of connection portions 230 are coupled, a through hole 258 penetrated by the lower region 116 of the output shaft 110, a first protrusion region 254 protruding upward from the upper surface, and the first spline portion 256 formed on an inner circumferential surface of the first protruding region 254.

The first spline portion 256 of the first carrier 250 may be coupled to the second spline portion 118 of the output shaft 110. Through this, it is possible to stably guide the movement of the planetary gear set 200 with respect to the output shaft 110.

The second carrier 260 may include a second coupling hole 262 to which the plurality of connection portions 230 are coupled, and a third clutch portion 264 protruding downward from a lower surface.

The third clutch portion 264 may be coupled to a fourth clutch portion 179 of the rotor shaft 170. Specifically, when the planetary gear set 200 is moved downward, the third clutch portion 264 of the second carrier 260 of the planetary gear set 200 is coupled to the fourth clutch portion 179 of the rotor shaft 170 to rotate together. Through this, since the plurality of pinion gears 220 and the rotor shaft 170 are synchronized, it is possible to implement high-speed and low-torque spin-drying mode of 1:1.

The first helical gear 214 may be formed on the outer circumferential surface of the sun gear 210, the second helical gear 222 may be formed on the outer circumferential surface of the plurality of pinion gears 220, and the third helical gear 242 may be formed on the inner circumferential surface of the ring gear 240. Since the planetary gear set 200 is moved in the vertical direction as a whole, a helical gear may be formed in the sun gear 210, the plurality of pinion gears 220, and the ring gear 240. Through this, it is possible to increase the safety factor of the gears provided in the planetary gear set 200, and reduce the noise generated during gear rotation.

The planetary gear set 200 may be disposed between the first bearing 140 and the second bearing 160. Through this, since the length in the axial direction in the drive system 100 of the washing machine can be reduced, it is possible to increase the space efficiency of the washing machine.

The ring gear 240 may include a groove 246 formed on an outer circumferential surface and in which the first actuator 150 is disposed. The groove 246 may extend in the circumferential direction. The entire planetary gear set 200 including the ring gear 240 may be moved in the vertical direction by the first actuator 150 disposed in the groove 246. Through this, it is possible to move the entire planetary gear set 200 in the vertical direction while improving space efficiency.

The first actuator 150 may move the planetary gear set 200 in the vertical direction.

The rotor shaft 170 may be coupled to the motor 190. The rotor shaft 170 may be bearing-coupled to the housing 120. The rotor shaft 170 may be rotatably coupled to the housing 120 by the second bearing 160.

The rotor shaft 170 may include a flange portion 172 including a protrusion 174 coupled to the motor 190, a clutch region 177 protruding upward from a central region of the flange portion 172, the fourth clutch portion 179 formed on an upper surface of the clutch region 177, a spline region 176 protruding upward from the clutch region 177, and the fourth spline portion 178 protruding outward in the radial direction from an upper part of the spline region 176.

The fourth clutch portion 179 may be coupled to the third clutch portion 264 formed on a lower surface of the second carrier 260. Through this, when the planetary gear set 200 moves downward, the fourth clutch portion 179 is coupled to the third clutch portion 264 to rotate integrally.

The fourth spline portion 178 may be formed on the outer circumferential surface of the rotor shaft 170. Specifically, the fourth spline portion 178 may be formed on an outer circumferential surface of the spline region 176. The fourth spline portion 178 may be spline-coupled to the third spline portion 212 formed on the inner circumferential surface of the sun gear 210. Through this, it is possible to stably guide the movement of the planetary gear set 200 with respect to the rotor shaft 170.

The motor 190 may be disposed on one side of the housing 120. The motor 190 may be disposed below the housing 120. The motor 190 may be coupled to the rotor shaft 170. The motor 190 may receive power from the outside and rotate in one direction or the other direction to rotate the rotor shaft 170 in one direction or the other direction.

The fifth bearing 130 may be disposed between the output shaft 110 and the housing 120. The fifth bearing 130 may rotatably couple the output shaft 110 to the housing 120.

The bushing 180 may be disposed between at least a part of the output shaft 110 and the rotor shaft 170. The bushing 180 may be disposed between the lower region 116 of the output shaft 110 and the rotor shaft 170. Through this, it is possible to prevent parts from being damaged when the rotational speeds of the rotor shaft 170 and the output shaft 110 are different.

Figure 12:
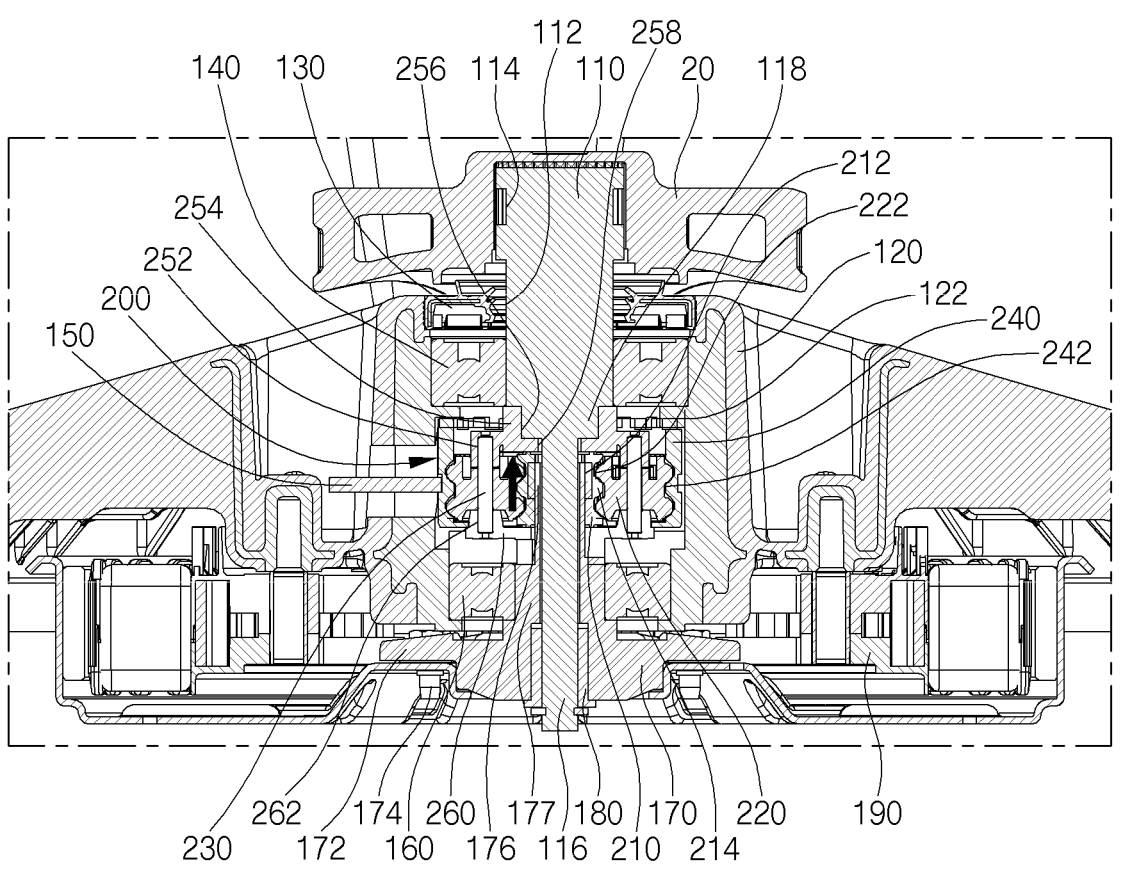
FIGS. 12 and 13 are operational diagrams of a drive system of a washing machine according to an embodiment of the present disclosure.
Figure 13:
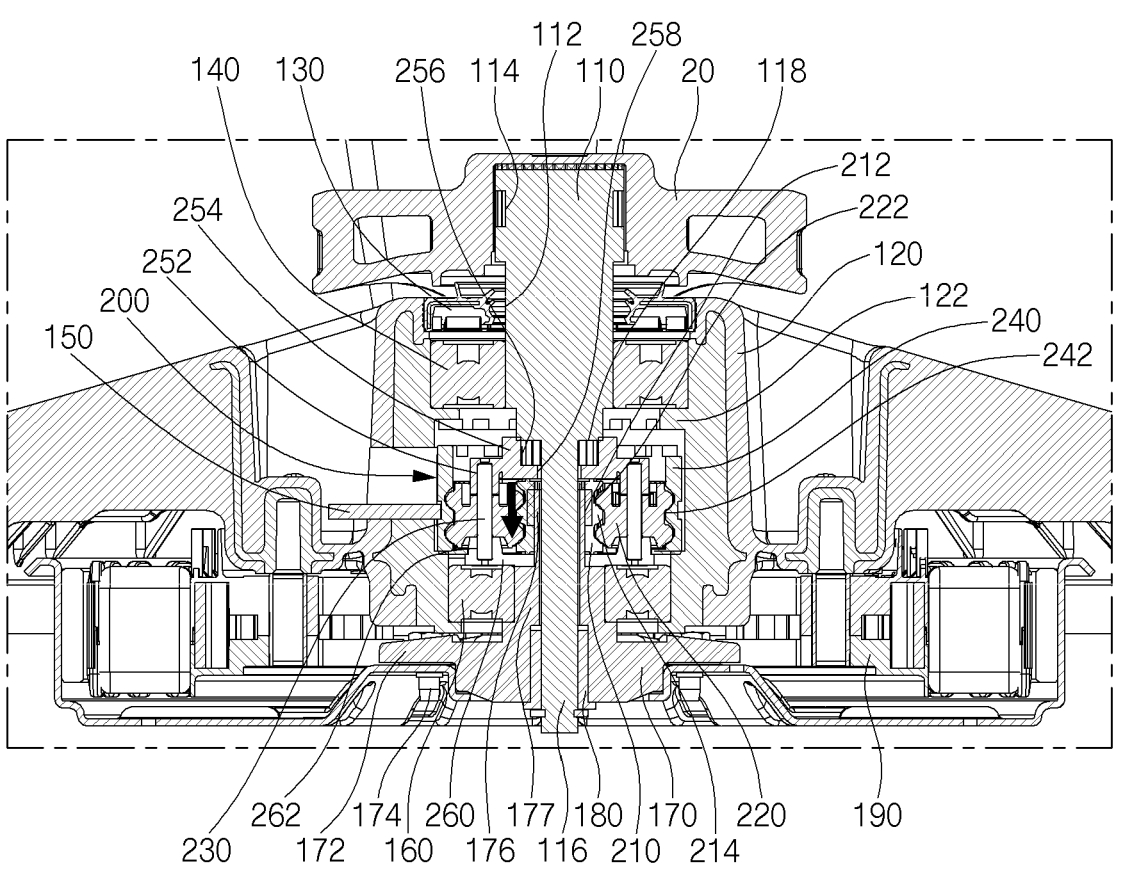

FIGS. 12 and 13 are operational diagrams of a drive system of a washing machine according to an embodiment of the present disclosure.

Referring to FIG. 12, the planetary gear set 200 is moved upward by the first actuator 150. In this case, the first clutch portion 244 of the ring gear 240 of the planetary gear set 200 may be engaged with and fixed to the second clutch portion 124 of the housing 120. With the ring gear 240 fixed, as the rotor shaft 170 rotates, the sun gear 210 rotates, and the sun gear 210 causes the pinion gear 220 to rotate and revolve. In this case, the rotational force of the rotor shaft 170 is reduced at a gear ratio of n:1 and transmitted to the output shaft 110 so that the output shaft 110 rotates at low speed and high torque.

Referring to FIG. 13, the planetary gear set 200 is moved downward by the first actuator 150. In this case, the third clutch portion 264 of the second carrier 260 of the planetary gear set 200 is engaged with the fourth clutch portion 179 of the rotor shaft 170, and the plurality of pinion gears 220 connected to the second carrier 260 do not rotate but revolve. The planetary gear set 200 transmits the rotational force of the rotor shaft 170 to the output shaft 110 at a ratio of 1:1 so that the output shaft 110 rotates at high speed and low torque.

According to the drive system 100 of the washing machine according to an embodiment of the present disclosure, it is possible to implement the washing mode and the spin-drying mode by moving the entire planetary gear set 200 without a stop operation between ending washing and starting spin-drying.

Figure 14:
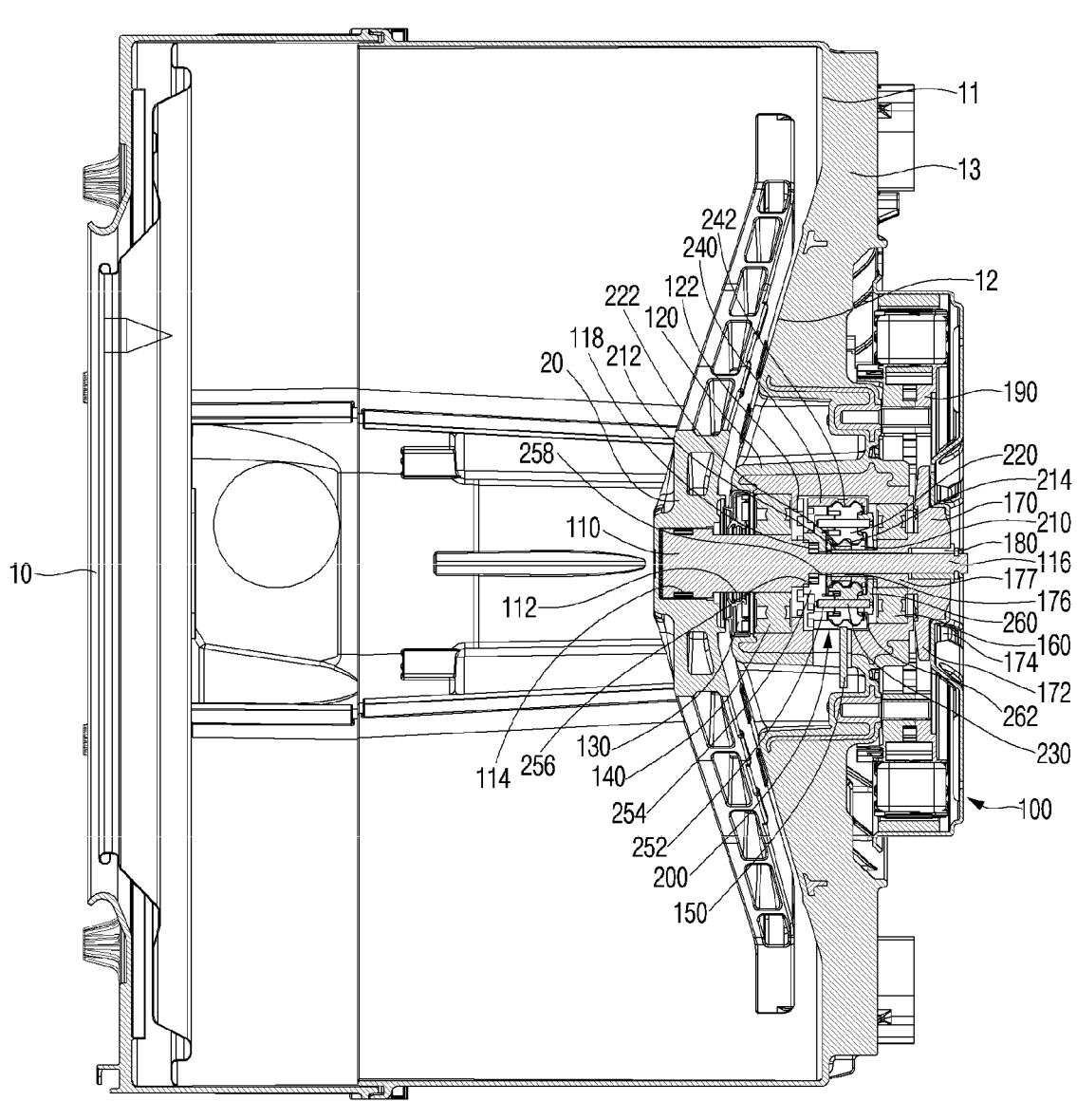
FIG. 14 is a cross-sectional view of a drum washing machine according to an embodiment of the present disclosure.

FIG. 14 is a cross-sectional view of a drum washing machine according to an embodiment of the present disclosure.

Referring to FIG. 14, a drum washing machine according to an embodiment of the present disclosure may include an inner tub 10, a pulsator 20, and a drive system 100 of a washing machine, but it may be implemented except for some of these configurations, and does not exclude other additional configurations.

It may be understood that a detailed configuration of the drum washing machine according to an embodiment of the present disclosure, which is not described below, is the same as a detailed configuration of the washing machine according to an embodiment of the present disclosure described in FIGS. 1 to 13.

The drum washing machine may be a front loading type in which the center of rotation of the inner tub 10 is formed in a direction horizontal to the floor or to be inclined in a direction that goes down toward one side, and it is designed to be able to input the laundry from the other side.

The inner tub 10 may include one surface 11, a second protruding area 12 protruding from the central area of one surface 11 to the other side, and a plurality of ribs 13 protruding from the one surface 11 to one side.

A pulsator 20 may be disposed on the other side of the one surface 11 of the inner tub 10. The drive system 100 of the washing machine may be disposed on one side of the one surface 11 of the inner tub 10. The one surface 11 of the inner tub 10 may be penetrated by the output shaft 110.

Based on FIG. 14, it may be understood that one side means the right side, the other side means the left side, and the vertical direction means the up and down direction.

The washing machine drive system 100 may include a housing 120, an output shaft 110, a first bearing 140, a second bearing 160, a planetary gear set 200, an actuator 150, a rotor shaft 170, a motor 190, and a bushing 180, but it may be implemented except for some of these configurations, and does not exclude other additional configurations.

It may be understood that a detailed configuration of the drive system 100 of the drum washing machine according to an embodiment of the present disclosure, which is not described below, is the same as a detailed configuration of the drive system 100 of the drum washing machine according to an embodiment of the present disclosure described in FIGS. 1 to 13.

The housing 120 may be integrally formed with the inner tub 10. The housing 120 may be double-injected with the inner tub 10. Specifically, the housing 120 may be double-injected into the second protruding area 12 of the inner tub 10. In this case, the inner tub 10 may be formed of a plastic material, and the housing 120 may be formed of a metal material. Through this, it is possible to reduce the tolerance that may occur between the housing 120 and the inner tub 10, and reduce the manufacturing cost of the drum washing machine, compared to forming and combining the housing 120 and the inner tub 10, separately.

The planetary gear set 200 may be disposed on one side of the inner tub 10. The planetary gear set 200 may be moved in the horizontal direction by the actuator 150. The planetary gear set 200 may overlap with the inner tub 10 in the vertical direction as a whole. Specifically, the planetary gear set 200 may overlap with the one surface 11 of the inner tub 10, the second protruding 12, and the plurality of ribs 13 in the vertical direction as a whole. The first bearing 140 may overlap with the second protruding area 12 in the vertical direction. Through this, it is possible to improve space efficiency by reducing the length of the drum washing machine in the horizontal direction.

The second bearing 160 may not overlap with the inner tub 10 in the vertical direction. The motor 190 disposed on the one side of the housing 120 may not overlap with the inner tub 10 in the vertical direction. The second bearing 160 may overlap with the motor 190 in the vertical direction. Through this, heat generated from the motor can be easily dissipated to the outside.

Some or other embodiments of the present disclosure described above are not exclusive or distinct from one another. Some or other embodiments of the present disclosure described above may be used in combination or combined with each configuration or function.

For example, it means that configuration A described in specific embodiments and/or drawings and configuration B described in other embodiments and/or drawings may be combined. In other words, even when the combination between the components is not described directly, it means that the combination is possible except when it is described as not possible to combine.

The above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

What is claimed is:

1. A drum washing machine comprising:
an inner tub that extends in a horizontal direction; and
a drive system coupled to the inner tub, the drive system comprising:
    a housing that has an internal space and is integrally provided with the inner tub,
    a motor disposed at a side of the housing,
    a rotor shaft coupled to the motor and the housing,
    an output shaft coupled to the housing, at least a part of the output shaft being disposed in the rotor shaft,
    a planetary gear set disposed in the internal space of the housing, the planetary gear set comprising (i) a first portion coupled to the rotor shaft and (ii) a second portion coupled to the output shaft,
    an actuator configured to move the planetary gear set along the horizontal direction,
    a first bearing disposed in the internal space of the housing and disposed between an outer surface of the output shaft and an inner surface of the housing, and
    a second bearing disposed in the internal space of the housing and disposed between an outer surface of the rotor shaft and the inner surface of the housing, the second bearing rotatably coupling the rotor shaft to the inner surface of the housing.

2. The drum washing machine of claim 1, wherein the inner tub is made of a plastic material, and
wherein the housing is made of a metal material and double-injected with the inner tub.

3. The drum washing machine of claim 2, wherein the inner tub comprises a protruding area that protrudes from a central area of a first surface of the inner tub toward a second surface opposite to the first surface, and
wherein the housing is double-injected into the protruding area.

4. The drum washing machine of claim 1, wherein the planetary gear set is disposed between the first bearing and the second bearing.

5. The drum washing machine of claim 4, wherein the inner tub comprises a protruding area that protrudes from a central area of a first surface of the inner tub toward a second surface opposite to the first surface,

wherein the first bearing overlaps with the protruding area along a vertical direction orthogonal to the horizontal direction, and wherein the second bearing is spaced apart from the first bearing in the horizontal direction such that the second bearing does not overlap with the inner tub along the vertical direction.

6. The drum washing machine of claim 1, wherein an entirety of the planetary gear set overlaps with the inner tub along a vertical direction orthogonal to the horizontal direction.

7. The drum washing machine of claim 1, wherein the motor is spaced apart from the inner tub in the horizontal direction such that the motor does not overlap with the inner tub along a vertical direction orthogonal to the horizontal direction.

8. The drum washing machine of claim 1, wherein the planetary gear set comprises:

a sun gear coupled to the rotor shaft;

a plurality of pinion gears spaced apart from one another in a circumferential direction and coupled to an outer circumferential surface of the sun gear;

a ring gear having an inner circumferential surface coupled to the plurality of pinion gears; and a carrier coupled to the plurality of pinion gears and the output shaft.

9. The drum washing machine of claim 8, wherein the planetary gear set is configured to:

based on the actuator moving the planetary gear set to a first side along the horizontal direction to thereby couple a part of the planetary gear set to the rotor shaft, transmit a rotational force of the rotor shaft to the output shaft with a first gear ratio; and based on the actuator moving the planetary gear set to a second side along the horizontal direction to thereby couple another part of the planetary gear set to the housing, reduce and transmit the rotational force of the rotor shaft to the output shaft with a second gear ratio different from the first gear ratio.

10. The drum washing machine of claim 9, wherein the first gear ratio is 1:1, and the second gear ratio is n:1, wherein n is greater than 1.

11. The drum washing machine of claim 8, wherein each of the sun gear, the plurality of pinion gears, and the ring gear comprises one or more helical gears.

12. A drum washing machine comprising:

an inner tub that extends in a horizontal direction; and a drive system coupled to the inner tub, the drive system comprising:

a housing that has an internal space, a motor disposed at one side of the housing, a rotor shaft coupled to the motor and the housing, an output shaft coupled to the housing, at least a part of the output shaft being disposed in the rotor shaft, a planetary gear set disposed in the internal space of the housing, the planetary gear set comprising (i) a first portion coupled to the rotor shaft and (ii) a second portion coupled to the output shaft, an actuator configured to move the planetary gear set along the horizontal direction, a first bearing disposed in the internal space of the housing and disposed between an outer surface of the output shaft and an inner surface of the housing, and

a second bearing disposed in the internal space of the housing and disposed between an outer surface of the rotor shaft and the inner surface of the housing, the second bearing rotatably coupling the rotor shaft to the inner surface of the housing, wherein an entirety of the planetary gear overlaps with the inner tub in a vertical direction orthogonal to the horizontal direction.

13. The drum washing machine of claim 12, wherein the inner tub comprises a protruding area that protrudes from a central area of a first surface of the inner tub toward a second surface opposite to the first surface, and wherein the housing is double-injected into the protruding area.

14. The drum washing machine of claim 12, wherein the planetary gear set is disposed between the first bearing and the second bearing.

15. The drum washing machine of claim 14, wherein the inner tub comprises a protruding area that protrudes from a central area of a first surface of the inner tub toward a second surface opposite to the first surface, wherein the first bearing overlaps with the protruding area in the vertical direction, and wherein the second bearing is spaced apart from the first bearing in the horizontal direction such that the second bearing does not overlap with the inner tub along the vertical direction.

16. The drum washing machine of claim 12, wherein the motor is spaced apart from the inner tub in the horizontal direction such that the motor does not overlap with the inner tub along the vertical direction.

17. The drum washing machine of claim 12, wherein the planetary gear set comprises:

a sun gear coupled to the rotor shaft;

a plurality of pinion gears spaced apart from one another in a circumferential direction and coupled to an outer circumferential surface of the sun gear;

a ring gear having an inner circumferential surface coupled to the plurality of pinion gears; and a carrier coupled to the plurality of pinion gears and the output shaft.

18. The drum washing machine of claim 17, wherein each of the sun gear, the plurality of pinion gears, and the ring gear comprises one or more helical gears.

19. The drum washing machine of claim 12, wherein the planetary gear set is configured to:

based on the actuator moving the planetary gear set to a first side along the horizontal direction to thereby couple a part of the planetary gear set to the rotor shaft, transmit a rotational force of the rotor shaft to the output shaft with a first gear ratio; and based on the actuator moving the planetary gear set to a second side along the horizontal direction to thereby couple another part of the planetary gear set to the housing, reduce and transmit the rotational force of the rotor shaft to the output shaft with a second gear ratio different from the first gear ratio.

20. The drum washing machine of claim 19, wherein the first gear ratio is 1:1, and the second gear ratio is n:1, wherein n is greater than 1.

* * * * *